United States Patent [19]
Chedeville et al.

[11] Patent Number: 5,450,146
[45] Date of Patent: Sep. 12, 1995

[54] HIGH FIDELITY REPRODUCTION DEVICE FOR CINEMA SOUND

[75] Inventors: Pascal Chedeville, Clichy; Jean-Georges Kaspar, Palaiseau, both of France

[73] Assignee: Digital Theater Systems, L.P., Westlake Village, Calif.

[21] Appl. No.: 943,115

[22] Filed: Sep. 10, 1992

Related U.S. Application Data

[63] Continuation of Ser. No. 776,409, Nov. 25, 1991, abandoned.

[30] Foreign Application Priority Data

May 24, 1989 [FR] France ................. 89 06807

[51] Int. Cl.$^6$ ............................................. G03B 31/04
[52] U.S. Cl. ........................................... 352/31; 352/5; 352/12; 352/20; 352/25; 352/92
[58] Field of Search ............. 352/85, 236, 5, 6, 10, 352/12, 20, 25, 31, 32, 92, 237; 358/337, 339, 343; 360/14.2, 14.3, 36.2; 364/239.1

[56] References Cited

U.S. PATENT DOCUMENTS

| | | | |
|---|---|---|---|
| 3,591,266 | 7/1971 | Ried | 352/27 |
| 3,820,881 | 6/1974 | Friesen | 352/5 |
| 4,040,026 | 8/1977 | Gernelle | 364/239.1 |
| 4,235,531 | 11/1980 | McCormick | 352/27 |
| 4,318,541 | 4/1983 | Baumann et al. | 364/239.1 |
| 4,423,482 | 12/1983 | Hargrove et al. | 364/239.1 |
| 4,506,348 | 3/1985 | Miller et al. | |
| 4,527,233 | 7/1985 | Ambrosius et al. | 364/239.1 |
| 4,600,280 | 7/1986 | Clark | 352/27 |
| 4,839,733 | 6/1989 | Karamon et al. | |
| 4,860,193 | 8/1989 | Bentley et al. | 364/239.1 |

FOREIGN PATENT DOCUMENTS

| | | |
|---|---|---|
| 40188 | 11/1981 | European Pat. Off. . |
| 0204578 | 12/1986 | European Pat. Off. . |
| 0372155 | 6/1990 | European Pat. Off. . |
| 2410296 | 6/1979 | France . |
| 2594238 | 8/1987 | France . |
| 8504024 | 9/1985 | WIPO . |
| 90/14614 | 11/1990 | WIPO . |
| 91/16709 | 10/1991 | WIPO . |
| 9206409 | 4/1992 | WIPO . |

OTHER PUBLICATIONS

Journal Of The British Kinematograph Society, vol. 67, No. 9, Sep. 1985, pp. 538–543, P. Smith, "A Three Channel Solid State Sound Store".

Electronics & Wireless World, vol. 93, No. 1601, Mar 1986, pp. 29–32, J. R. Watkinson, " Digital Audio Edition".

*Primary Examiner*—Monroe H. Hayes
*Attorney, Agent, or Firm*—Koppel & Jacobs

[57] ABSTRACT

Dynamic range and passband problems in cinema sound transmission are solved by using a laser disk (9) read by a laser disk player (10, 11, 12) synchronized (14) with the original sound track of the film. Problems relating to splices in the film are solved by reading the sound in advance, in storing it in a memory (13), in reading it back subsequently from the memory, and, where necessary, in causing the memory read back system to jump (24) in order to avoid reproducing sound that corresponds to images that have been removed from the film.

42 Claims, 2 Drawing Sheets

HIGH FIDELITY REPRODUCTION DEVICE FOR CINEMA SOUND

This application is a Continuation of application Ser. No. 07/776,409, filed on Nov. 25, 1991, now abandoned.

BACKGROUND OF THE INVENTION

The present invention relates to a high fidelity reproduction device for cinema sound. It seeks to improve the quality of the sound that accompanies the projection of the images in films that are being viewed.

DESCRIPTION OF THE RELATED ART

At present, cinema films include a sound track and an image track. The sound track is laterally offset on the film relative to the image track. The image track is moved in jerks past the lamp of a projector, and the image is projected onto a screen looked at by the audience. The sound track passes through a sound detector connected to an audio system for emitting the sounds to be heard. For various reasons, and in particular because the images move jerkily, a film projector has its sound track reader offset relative to the projector lamp. In general, the sound reader is located upstream in the film running direction. Given that projected films comprise images fixed by chemical processes after shooting, a method has been developed for transcribing the sound onto the sound track using the same techniques. Consequently, the sound track appears as a channel having a portion of its area blackened with the remainder thereof being transparent. In outline, the sound detector comprises a lamp which illuminates the sound track by transparency or by reflection where the track is facing a photodetector cell. The light energy picked up by the photodetector cell is representative, at all instants, of the percentage of blackness on the corresponding illuminated section of the track.

In order to improve the quality of sound production, sound tracks have been made with two independent channels which are then used stereophonically. For stereophonic detection, respective photodetector cells detect signals transcribed optically onto each of the channels. A detector cell corresponding to the right path may, for example, detect the brightness that appears through the righthand portion of the sound track, while a photodetector cell corresponding to the left stereophonic path detects the portion which corresponds to the left portion of the sound track. This configuration has the advantage of enabling cinemas equipped for reproducing monophonic sound to continue operating: their single photo cells detect the central portion of the sound track and therefore deliver a signal which naturally represents the sum of the signals of the two stereophonic paths.

In order to improve sound distribution, suitably equipped cinemas have three loudspeakers behind the screen facing the public and a series of small loudspeakers in the auditorium. An encoding system is used to simulate three-dimensional sound distribution. Given the manufacturing technology used, and in particular the chemical developing of films, the optical sound track suffers from two major faults. Firstly the available dynamic range is small. It is limited to about 40 dB whereas a dynamic range of 90 dB is necessary. In addition, the bandwidth that can be passed to each stereophonic path passed is narrow. A bandwidth of 11 kHz is a result that is generally accepted. A bandwidth of 14 kHz can be obtained only accidentally or at very great expense: i.e. less easily reproducible under present conditions in all cinemas.

As far as possible, any modification to such an audio reproduction system for the purpose of improving it must take account of compatibility with existing cinemas. To enable a technical advance to be easily accepted by cinema operators, it is necessary for films to be capable of being projected without distinction and in the same manner beth in cinemas having improved equipment and in cinemas that are not so equipped. If it is necessary to segregate film distribution as a function of cinemas fitted with special equipment and cinemas not having special equipment for reproducing improved sound, then there is a great likelihood that such an attempt at improving cinema sound will fail because of the distribution difficulties which it entails. Nevertheless, the invention is also applicable to circumstances in which the sound track(s) is/are replaced by other means due to a change in technology.

In the invention, the idea is to solve problems of dynamic range and bandwidth of the sound track in conventional films by using a laser disk read by a laser disk player. Laser disk technology is so well established that laser disk players are not expensive. As a result, implementing the improvement of the invention is within the means of all cinema operators.

In the invention, the idea is to solve problems of dynamic range and bandwidth of the sound track in conventional films by using a laser disk read by a laser disk player. One of the principles of the invention consists in adding encoding to a film to enable the disk player to be synchronised with the running of the film. The document WO-A-8 504 024 concerns a teaching by which it is proposed to replace a classical coding of the sound by a crypted coding. Codings are recorded vis-a-vis the images and are linked to addresses on a laser disk where corresponding sounds are memorised. It is particularly noted in this document that a servo system is proposed for synchronising the sound support with the image support. This means that, if ever a cut in the film occurs, the laser disk will continue to transmit the sound corresponding to the cut portion but that this sound should be transmitted at a more rapid speed in order to catch up with the delay effects of the disk with regard to the running of the image, these delay effects being due to the cut in the film. This gives a very bad effect. The FR-A-2 594 238 document proposes a teaching of the same order which leads, particularly when the film cuts are greater than four seconds, to diffusion disorders.

A major problem arises in fact when a film has been cut and spliced. This may happen if the film has been torn, or if the cinema operator seeks to break up projection of the film with advertising. Present projection-room practice then consists in cutting the film with scissors, possibly removing a faulty torn portion, and in splicing the two intact ends back together, or if advertising is to be projected, in splicing the intact ends to the beginning and the end of the advertising film. The use of a laser disk suffers from the drawback that laser disk player synchronisation is not immediate. The player takes about one second to find the corresponding sound and reproduce it. The read seek time with a laser disk player thus gives rise to interfering noises or to no sound at all, thus giving a bad impression. In addition, one of the difficulties encountered comes from the fact that when a torn portion is removed, the sound track reader (which may be used for synchronisation purposes) is necessarily offset from the projection lamp, and as a result some of the sound recording corresponding to existing images is lost while some of the sound recording corresponding to images that are now missing is retained.

The invention includes the idea of remedying these drawbacks and proceeding differently. A different sound medium is used, and preferably a laser disk associated with a laser disk player. However, reading is performed in advance of the sound to be reproduced. Since this is not in real time, the sound read from the medium is stored in a memory. The stored sound is then read from the memory and is reproduced at the appropriate moment: i.e. in correspondence with the images being projected. When a break appears in the film, those portions of the prerecorded sound that correspond to the images removed from the film are not read. The system skips to the following portions of sound. This avoids problems associated with the seek time of the player for the medium used. This result is obtained because seeking and reading from a memory is substantially instantaneous: it is very much faster than seeking and reading from a laser disk.

As a result, the present invention has for object a high fidelity reproduction device for cinema sound, the device comprising:

a first optical detector for reading a first signal that is optically encoded on a "sound-encoding" track presented in correspondence with an "image" track on a cinema film;

an audio system for producing sounds corresponding to said first encoded signal that is read as a function of the sound-encoding track moving past the first detector; and another reading system for reading a second encoded signal carried on a medium other than the sound track and corresponding to the first encoded signal, the device being characterised in that it comprises:

a memory for storing the second signal read;

a control system comprising means for reading the second encoded signal on the other medium early (N+M) relative to the passage of the corresponding images (n) of the film corresponding to said second encoded signal;

means for recording the second signal in the memory and for storing it therein;

means for subsequently picking up said second signal from the memory;

means for acoustically emitting a corresponding sound that is late (N) relative to the moment it is read from the other medium and that occurs at the same time as the passage of the corresponding images of the image track; and means for sometimes not acoustically emitting a portion of said corresponding sound which corresponds to missing images due to a cut in the film.

The invention will be better understood on reading the following description and on examining the accompanying figures. These are given purely by way of non-limiting example of the invention. In the figures:

DETAILED DESCRIPTION OF THE PREFERRED EMBODIMENTS

Figure 1:
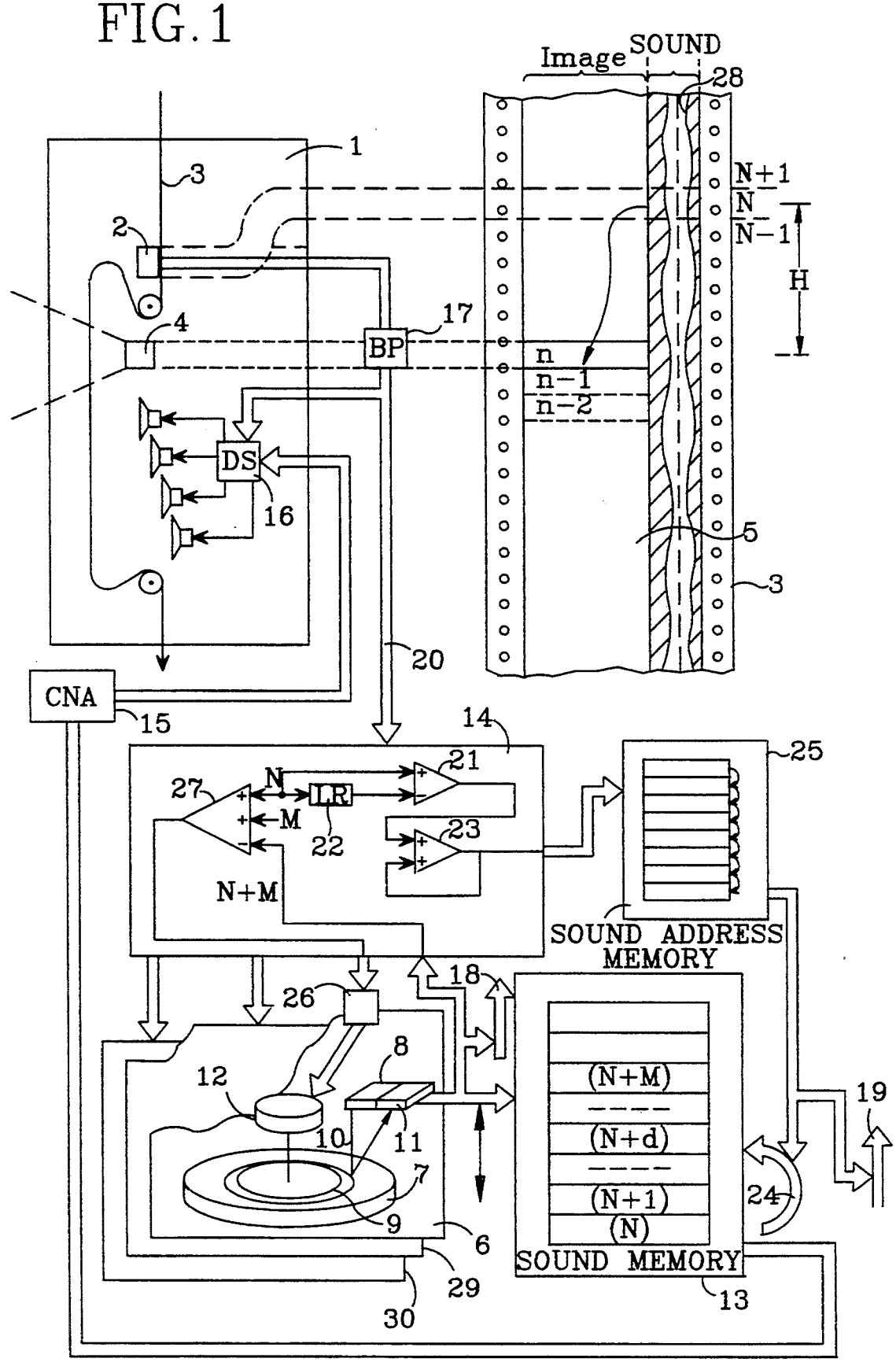
FIG. 1 shows a high fidelity sound reproduction device of the invention.

Very diagrammatically, FIG. 1 shows a cinema projector 1 containing a detector 2 for detecting a signal that is optically encoded on a sound track 28 of a film 3 and a projection lamp 4 for projecting the images contained on an image track 5 of the same film. The sound track detector is conventionally placed upstream from the lamp 4 relative to the direction in which the film 3 runs. The offset that results from this upstream position of the detector 2 is written H in the diagram of the film 3. This means that when the lamp 4 illuminates an image n in the image track 5, the detector 2 detects sound N corresponding to the image being projected. In practice, the offset H corresponds to the time required for projecting 18 to 20 images. This time is standardized. An effect of the offset H is that if there is a cut in the film 3 immediately after an image and if some number "d" of images are omitted, then there will be an offset in the correspondence between the sound and the image. This offset lasts for the time taken for the length H of film to run past the lamp 4 or past the detector 2. Given that films are run at a speed of about 24 images per second, the duration of a sound offset that results therefrom is a little longer than half a second: the "jump" in the sound is entirely perceptible.

To remedy these drawbacks, the invention makes use of another reading system: for example, and preferably, a system 6 for reading a laser disk 7. In this preferred example, this other system 6 comprises a laser source 8 illuminating an optical track 9 on the disk 7. The light signal 10 is detected by a cell 11. A motor 12 rotates the disk 7. The system of the invention also includes a memory 13 for recording sound. The memory is controlled by a control system 14 which makes it possible to read sound in advance relative to the corresponding images of the film being projected. Suppose, for example, that at a given instant the corresponding projected image of the film is image n, instead of reading sound N from the disk 7, sound N+M is read at the moment the image n is being projected. The control system 14 causes the sound N+M to be stored in memory 13. This sound is stored, at least temporarily, and it is read back subsequently. If all goes well, the time the sound N+M is temporarily stored in the memory 13 is equal to the time required for projecting M images. Thus, at the moment when an image n+m is being projected, the previously stored sound N M is taken from the memory 13.

Sound is encoded digitally on the track 9 of a laser disk. Consequently, there is no difficulty in storing the sound in the memory words of the memory 13. With such a laser disk player, the digitally encoded sound is subsequently transformed into an analog signal by a digital-to-analog converter 15. From this point of view, the special feature of the invention consists specifically in inserting the memory 13 between the output from the photodetector 11 and the input to the digital-to-analog converter 15. The signal delivered by the digital-to-analog converter 15 is then delivered to a sound effects device 16 which is conventionally connected with a plurality of sound-emitting paths. Sound is thus emitted in the same way as it would be in the state of the art. To this end, a switching circuit 17 capable of detecting the presence of a synchronization code for sound to be produced by the second reader system serves either to implement the improvement of the invention, or else to ignore it, if the film 3 has not been prepared for this purpose.

The temporary storage sound in the memory 13 may be organized in various different ways. In a simple example, the memory 13 comprises M shift registers which are emptied in succession one after another. Under such circumstances, sound is always recorded in the first register and sound is always read from the last register. In a preferred solution, advantage is taken of the fact that sound distributed by means of a laser disk includes digital encoding providing information not only on the frequency and amplitude characteristics of the. sound to be produced, but also on the address of the corresponding portion of the sound on the laser disk itself. In practice, instead of using a memory comprising M shift registers which could be expensive, it is preferable to use a random access memory including a first address pointer for storing successive sounds by writing to memory locations with the addresses of the memory locations being incremented on each occasion. The random access memory also includes a second memory word address pointer for use in reading the sound to be reproduced. The addresses of the memory words being read are smaller by the number of memory words corresponding to the stored sounds. As represented by arrows 18 and 19, these two pointers thus move the write and read addresses respectively through the memory 13. By acting in this way, a kind of rotary memory is established which rotates endlessly on itself. Each of the address pointers begins again from zero once it has reached its maximum address in the memory. The memory 13 is then of the first-in-first-out type (FIFO).

When all is going well, i.e. when the film has not been repaired, previously recorded sound is taken from the memory 13 M "images" further on. In contrast, things take place differently if the film has been cut. On the basis of the following table, it is assumed that the film has been cut immediately after image n:

| FILM SOUND ADDRESS | IMAGE | | LASER SOUND ADDRESS | |
|---|---|---|---|---|
| N−1 | −H | n−1 −H | N−1 | |
| N−2 | −H | n−2 −H | N−2 | N+1 |
| N | −H | n −H | N | N+2 |
| ⟵⟶ | | | | |
| N+d | −H | n+1 −H | | ... |
| N+d+1 | −H | n+2 −H | N+d+1 | N+d |
| N+d+1 | −H | n+2 −H | N+d+1 | |
| N+d−1 | n | | N+d+H−1 | |
| ⟵⟶ | | | | |
| N+d | | n+d | N=d+H | |
| N+d+1 | | n+d+1 | | |
| TIME | | | | |

The boxes in this table are stacked one above the other in the opposite direction to the flow of time. Given the offset between the position of the reader 2 and of the lamp 4, the cut in the film does not appear at the same instant on both paths.

The table means that image numbers have moved forward regularly up to n, after which there is a jump directly to image n+d (d for "displacement") as the image following image n. Because of the offset H between the image reader and the reader for the corresponding portions of sound, it may be assumed that at the instant when image n+d is seen, the sound N+d is level with the detector 2.

In the present description, it is assumed that the sound is in discrete pieces, since compared with reality that simplifies explaining the operation of the invention. Indeed, if the sound is recorded digitally on a laser disk, then it really does exist in discrete pieces. However, this is not the case if the other sound medium is a magnetic tape. Under such circumstances, the memory 13 is an analog memory, e.g. a delay line. In practice, the "address" of the sound on the sound track may be an address corresponding to many memory words, all relating to the same image.

Not only does a tear in the film have the effect of skipping from image n to image n+d, the same tear has the effect of causing the sound to skip from N-H to N+d-H. This is related solely to the difference in position between the lamp 4 and the reader 2. Given the sound skip between address N-H and the address N+d-H, the corresponding offset in sound address may be used for providing additional control of the read pointer in the memory 13. In one example, the sound address is encoded optically by being overprinted on the sound track. In another example, the sound address is encoded, optically again, in the inter-image gaps of the film. In yet another example, the original sound track is replaced by an optical synchronization signal. It is also possible to provide an additional sound track on the other side of the image track. The sound address is thus detected by the detector 2. Thus, a sound address signal 20 is applied to an address encoder. To simplify, the address encoder may comprise a first two-input subtractor 21. A positive first input receives a sound address and a negative second input receives the preceding sound address. To ensure that beth addresses are present simultaneously, the preceding address is passed through a delay line 22.

Under normal circumstances, when there has not been a tear, the two addresses present an increment of unity. This increment is applied to a first input of an adder 23 having a second input that receives the preceding sound output signal. Consequently, the adder 23 now delivers an address that is incremented by one notch relative to the address previously produced thereby. This new address is used to move the read address pointer arrow 19 through the memory 13. When an incident occurs, the subtractor 21 delivers an increment d instead of an increment of unity. The increment d is added by the adder 23 to the preceding address causing the memory reader 24 to jump in such a manner that the unusable sound (corresponding to the missing portion of the image is not reproduced). By acting in this way, problems relating to synchronization adjustment in the laser disk player are solved.

However, by acting in this way, a disagreeable shift may be caused as in the state of the art: for abeut half a second the sound reproduced from the laser disk will be sound that does not correspond to the images being projected. As shown in the above table, given that the sound address on the film jumps from N-H to N+d-H (and thus that this address has performed a jump) the system will not be synchronized with the sound that has not yet jumped given that at the moment when the sound address jumps the image signal being projected by the lamp 4 corresponds to images n-H (with a late offset of H) or n+1-H. It is only when the repair goes past the lamp 4 (n now n+d) that the sound will again be properly synchronized.

To avoid this effect, it is preferable to use a second memory 25 which receives the sound addresses and which stores them temporarily for a period of time corresponding to H images being projected. This means that the address jump 24 is not transmitted immediately to the read pointer of the memory 13. It is transmitted thereto after a time delay equal to the time required for the effect of the break to reach the lamp 4. The memory 25 may be of the same type as the memory 13: it may be of the first-in-first-out type. It differs therefrom merely in that there is no memory read address jump when a break occurs in the film. It is the information content of the memory word stored in the memory 25 that represents the jumps.

When using the term "jump" it is clear that so far this term has not been applied to a jump in reading the laser disk. Under all circumstances the jump can take place without seek time problems.

It is clear that if it is possible to jump d images at a repair, the number of memory words read in advance by the other read system must be greater than the longest possible break. In practice, it may be assumed that it is possible for there to be a break in the images of about 3 seconds (this does not mean that images are not projected for a period of 3 seconds, but that up to 3 seconds of the story may be omitted between one image and the following image). To give a safety margin, a period of five seconds is selected, thus requiring the memory 13 to have a capacity of about one million 16-bit words, assuming that the sound at the output from the laser disk player 6 is encoded on 16 bits.

However, it is possible that a film may have been torn several times and as a result the accumulated loss of images can be considerably greater than five seconds. For example, there may be as many as ten breaks leading to about one minute of the story being lost, and it is not practical to envisage storing that much sound in advance in the memory 13. The capacity required for storing one minute of sound would make its cost unacceptable. This difficulty is overcome by taking advantage of a laser disk's suitability for having its speed servo-controlled. To this end, use is made, for example, of the clock 26 for controlling reading from the laser disk, and the rate at which the clock is driven is a function of the observed difference between the sound address being read from the sound track and the sound address being read from the laser track 9. To this end, the sound address read from the sound track is applied to a positive first input of a comparator 27 while simultaneously applying the set size M for the buffer in the memory 13 to a positive second input of the comparator 27. The set size corresponds to the desired amount of read advance.

When all is going well, at the moment the sound address N is being read from the sound track, a sound address N+M is being read from the track 9 of the laser disk 7. This sound address N+M on the laser track 9 is applied to a negative third input of the comparator 27. Under such conditions, the comparator delivers a zero signal. This zero signal governs the clock 26 which thus runs at its normal frequency. The motor 12 is thus run normally.

However, when an incident occurs: i.e. when the addresses on the sound track jump from N-H to N+d-H, the comparator 27 delivers a signal which is no longer zero: the signal becomes substantially equal to d (to begin with). The signal d has the effect of accelerating speed of rotation 12 of the system 6 within a range of values that the system can accept. Under these conditions, the detector cell 11 delivers both the contents of the memory words to be stored in the memory 13 and the addresses of said words more quickly. Since these addresses being read are thus incrementing more quickly than the addresses being delivered normally by the sound track (after the tear), the difference becomes smaller, and little by little the motor 12 returns to its normal speed. Thus, by accelerating the sound recording, the difference that is to be maintained between writing and reading in the memory 13 is caught up. It may be observed under these circumstances that the "catching up" takes place even before the read jump 24 due to the tear in the film. This means that in practice the capacity of the memory may need to be such as to be twice the expected duration of a break. This constraint may naturally be avoided by catching up after an incident in the film has appeared, under which circumstances there is the risk of being unable to compensate for the effects of two tears in the film that are too close together.

Figure 2:
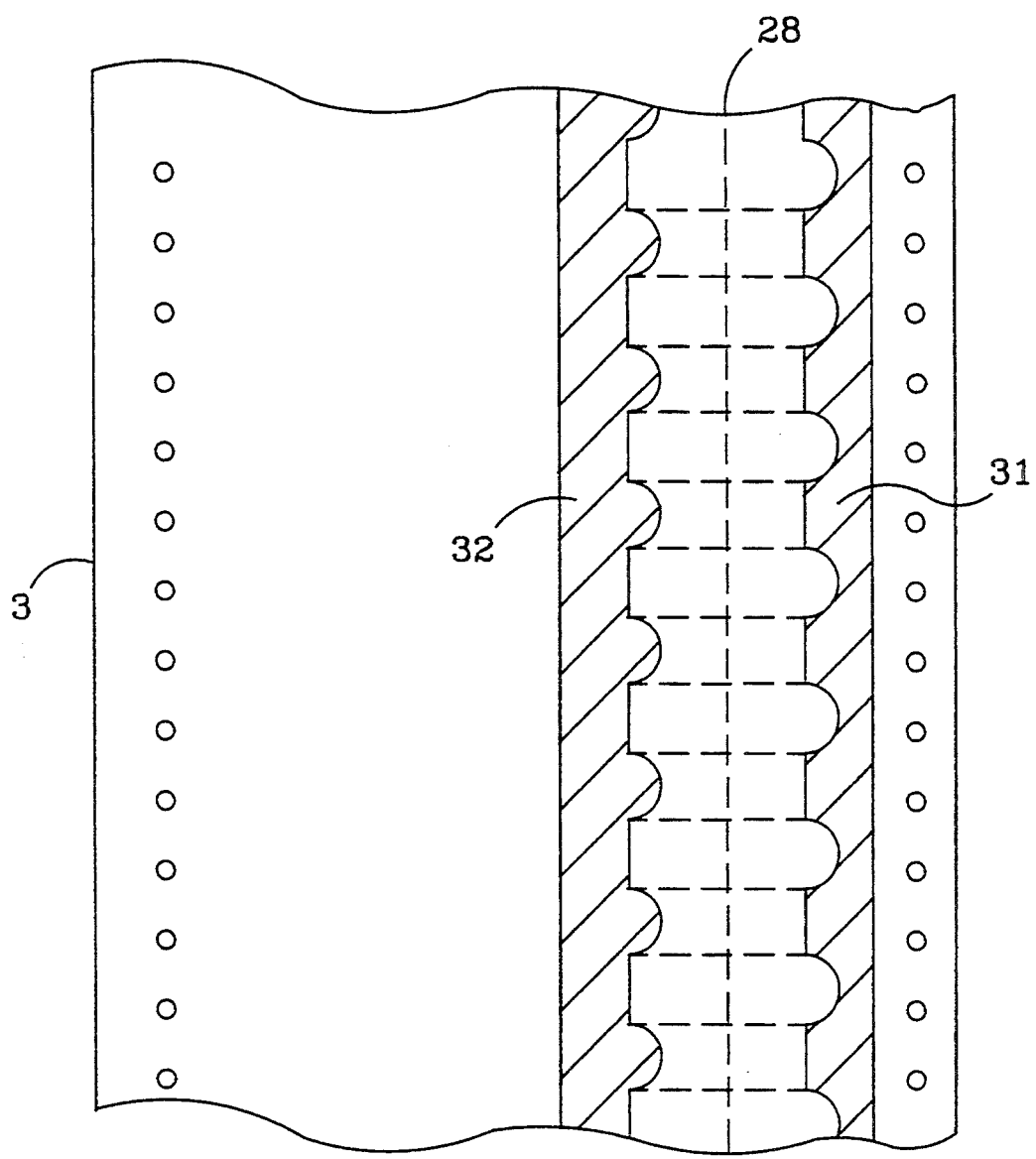
FIG. 2 shows an example of sound encoding suitable for implementing the invention.

Another problem to be solved consists in establishing synchronization of the laser disk with the film on starting. To this end, a high frequency signal may be established, e.g. in the sound track 28. In FIG. 2, a sound track 28 has two optical modulation paths 31 and 32 that are in phase opposition, they are said to be "antiphase". This overall modulation lies in the range 7 kHz to 11 kHz. This modulation is itself encoded (in amplitude or in frequency) to represent sound addresses on the sound track. These addresses are then decoded in the switching circuit 17. Under such circumstances, the circuit 17 contains a highpass filter on the antiphase path to extract the antiphase signal from the frequency greater than 7 kHz. The additional encoding 31-32 does not replace the encoded sound normally on the sound track. If so required, any optical encoding means may be considered in association with the same optical reader or with another optical reader. For example, the encoding could be replaced by additional code applied to another track (e.g. the left of the image track) which other track would co-operate with another optical reader. In addition, the circuit 17 is capable of recognizing from the sound addresses which laser disk (and which associated laser disk player) should be connected to the memory 13. To this end, FIG. 1 shows three laser disk systems: systems 6, 29, and 30. The use of a plurality of systems may also be required when the projection time exceeds the sound recording time available on a laser disk.

We claim:

1. A system for reproducing sound sequences corresponding to image sequences of a movie tape while the corresponding image sequences are being displayed, said system comprising:

(a) first means for reading a first address from a first memory medium disposed on a movie tape, wherein the first address is an address for data representing a first sound sequence corresponding to a first image sequence;

(b) second means, coupled to said first means, for reading sound sequence data associated with the first address from a second memory medium that is not part of the movie tape said second means having a reading speed;

(c) a third memory medium;

(d) third means, coupled to said second means and coupled to said third memory medium, for storing data read by said second means on said third memory medium;

(e) fourth means, coupled to said first and third means, for determining sound sequence data which does correspond to image sequences present on the movie tape and for determining sound sequence data which does not correspond to image sequences present on the movie tape;

(f) fifth means, coupled to said fourth means and said third memory medium, for reading sound sequence data from said third memory medium which does correspond to image sequences which are present on the movie tape, and for not reading sound sequence data from said third memory medium which does not correspond to image sequences which are present on the movie tape; and (g) sixth means, coupled to said fifth means, for producing sound corresponding to the sound sequence data read by said fifth means while corresponding movie images are being displayed.

2. A system according to claim 1 wherein said fourth means further comprises seventh means for timing production of sound to coincide with display of corresponding image sequences from the movie tape.

3. A system according to claim 1 and further comprising eighth means, coupled to said first means and coupled to said second means, for controlling the reading speed of said second means.

4. A system according to claim 1 and further comprising:

(a) ninth means, coupled to said first means, for determining when a first memory medium readable by said first means is not disposed on the movie tape and (b) tenth means, coupled to said ninth means, for coupling sound signals stored on the movie tape to a sound production system and for uncoupling said first means from said second means when said ninth means determines that a first memory medium readable by said first means is not disposed on the movie tape.

5. A system according to claim 1 wherein:

(a) said system further comprising eleventh means, coupled to the first means, for reading sound sequence data associated with the first address from a fourth memory medium;

(b) the fourth memory medium is distinct from the movie tape; and (c) said second and fourth memory media comprise compact disks.

6. A system according to claim 1 and further comprising twelfth means, coupled to said first means, for synchronizing the display of image sequences with production of sound sequences when movie tape play is begun, said twelfth means comprising means for reading a high frequency synchronizing signal on a sound track of the movie film.

7. A system according to claim 1 wherein said first means comprises an optical detector.

8. A system according to claim 1 wherein said second means comprises a compact disk reader.

9. A system according to claim 1 wherein said third memory medium comprises a plurality of shift registers.

10. A system according to claim 1 wherein said fourth means comprises a sound address memory which stores incremental differences between addresses of sound sequence data for sound corresponding to adjacent image sequences present on the movie tape.

11. A system according to claim 1 wherein:

(a) said first means comprises a high pass filter having a cutoff frequency coupled to a demodulator having a center frequency and (b) the center frequency of said demodulator is higher than the cutoff frequency of said high pass filter.

12. A system according to claim 1 and further comprising:

(a) thirteenth means for projecting and displaying image sequences from the movie tape and (b) a room for containing projected images of the movie tape and corresponding movie sound.

13. A system according to claim 1 and further comprising:

(a) a display means for displaying images from the movie tape and (b) a tape transporter for transporting the movie tape so that a point on the movie tape first passes by said first means and then passes by said display means after a delay time.

14. A system according to claim 13 wherein said fourth means further comprises delay means for delaying production of sound from a time after reading of sound sequence data to when corresponding image sequences are being displayed.

15. A system according to claim 1 wherein said third memory medium comprises random access memory.

16. A system according to claim 15 wherein said third means comprises a write address pointer for indicating the address at which sound sequence data read by said second means is to be stored in said random access memory.

17. A system according to claim 15 wherein said fifth means comprises a read address pointer for indicating said address at which sound sequence data is to be read from said random access memory.

18. A system according to claim 15 wherein:

(a) said fourth means comprises a sound address memory which stores incremental differences between addresses of sound sequence data for sound corresponding to adjacent image sequences present on the movie tape;

(b) said fifth means comprises a read address pointer for indicating the address at which sound sequence data is to be read from said random access memory; and (c) said system further comprises read address pointer control means, coupled to said sound address memory, for controlling to which memory location said read address pointer points.

19. A process for reproducing sound sequences corresponding to image sequences of a movie tape while the corresponding image sequences are being displayed, said process comprising the steps of:

(a) reading a first address for data from a first memory medium disposed on the movie tape, wherein the first address is an address for data representing a first sound sequence corresponding to a first image sequence;

(b) reading sound sequence data associated with the first address from a second memory medium that is not part of the movie tape;

(c) storing data read from said second memory medium on a third memory medium;

(d) determining sound sequence data which does correspond to image sequences present on the movie tape and determining sound sequence data which does not correspond to image sequences present on the movie tape;

(e) reading sound sequence data from said third memory medium which does correspond to image sequences which are present on the movie tape, and not reading sound sequence data from the third memory medium which does not correspond to image sequences which are present on the movie tape; and (f) producing sound corresponding to the sound sequence data read from said third memory medium while displaying corresponding movie tape images.

20. A process according to claim 19 and further comprising the step of timing production of the sound to coincide with display of corresponding image sequences from the movie tape.

21. A process according to claim 19 and further comprising the step of controlling the speed of reading of the second memory medium to account for missing segments of the movie tape.

22. A process according to claim 19 and further comprising the steps of:

(a) determining when the first memory medium storing the first address data is not disposed on the movie tape and (b) coupling sound signals stored on the movie tape to a sound production system when said first memory medium storing the first address data is not disposed on the movie tape.

23. A process according to claim 19 wherein:

(a) said process further comprises the step of reading sound sequence data associated with said first address from a fourth memory medium, wherein said fourth memory medium is distinct from the movie tape and (b) said second and fourth memory media comprise compact disks.

24. A process according to claim 19 and further comprising synchronizing the display of image sequences with production of sound sequences when movie tape play is begun by reading a high frequency synchronizing signal on a sound track of the movie tape.

25. A process according to claim 19 wherein the first address is read from said first memory medium using an optical detector.

26. A process according to claim 19 wherein said second memory medium is read by a compact disk reader.

27. A process according to claim 19 wherein said third memory medium comprises a plurality of shift registers.

28. A process according to claim 19 and further comprising the step of storing incremental differences between addresses of sound sequence data for sound corresponding to adjacent image sequences present on the movie tape.

29. A process according to claim 19 and further comprising the step of high pass filtering and demodulating the first address data using a demodulator the center frequency of which is higher than the cutoff frequency of said high pass filter.

30. A process according to claim 19 and further comprising the step of projecting and displaying image sequences from the movie tape while broadcasting sound corresponding to the image sequences.

31. A process according to claim 19 and further comprising the steps of:

(a) displaying images from the movie tape and (b) transporting the movie tape so that a point on the movie tape first passes by a means to read the first data and then passes by a means to display movie images after a delay time.

32. A process according to claim 31 and further comprising the step of delaying production of sound from a time after reading of sound sequence data to when corresponding image sequences are being displayed.

33. A process according to claim 19 wherein said third memory medium comprises random access memory.

34. A process according to claim 33 and further comprising the step of indicating the address at which sound sequence data read by said second means is to be stored in the random access memory with a write address pointer.

35. A process according to claim 33 and further comprising the step of indicating the address at which sound sequence data is to be read from the random access memory with a read address pointer.

36. A process according to claim 33 and further comprising the steps of:

(a) storing incremental differences between addresses of sound sequence data for sound corresponding to adjacent image sequences present on the movie tape in a sound address memory;

(b) indicating the address at which sound sequence data is to be read from said random access memory with a read address pointer using the sound address memory; and (c) controlling the memory location at which said read address pointer points to the indicated address.

37. A motion picture sound system for a motion picture that is provided on a film having a series of picture frames and a time code identifying locations along the film, comprising:

a relatively large capacity digital data storage means for storing digital audio data associated with said film locations, a relatively fast access digital data storage buffer for temporarily storing digital audio data from said relatively large capacity digital data storage means, means for converting digital audio data from said buffer to an analog audio signal, means for reading the time code on said film, and controller means responsive to the time code read by said reading means for accessing said relatively large capacity digital data storage means to shift digital audio data associated with the film locations identified by said time code to said buffer, and for accessing said buffer to shift digital audio data stored therein to said digital audio data converting means.

38. The motion picture sound system of claim 37, wherein said controller means shifts, from said large capacity digital data storage means to said buffer, digital audio data associated with film locations that follow the location for the time code currently read by said reading means, to facilitate a jump in accessing the audio data in said buffer when a jump in the time code is encountered.

39. The motion picture sound system of claim 38, further comprising means for projecting said picture frames, and means for providing the time code associated with said film locations to the controller means a predetermined advance period prior to the projections of said picture frames, said controller means coordinating the transfer of data between said relatively large capacity digital data storage means, said buffer and said digital audio data converting means so that an analog audio signal is provided in synchronism with the projection of said picture frames.

40. A method of producing a motion picture audio signal from a film which includes a series of picture frames and a time code adjacent to and identifying locations on the film, comprising:

provonding a relatively large capacity digital signal storage device which stores digital audio signals corresponding to successive locations on the film, scanning the film, reading the time code on the film as it is scanned, accessing the digital signal storage device to transfer therefrom the digital audio signals corresponding to the time code that has been read, temporarily storing said transferred digital audio signals in a relatively fast access, digital data storage buffer, reading out the digital audio signals temporarily stored in said digital data storage buffer in synchronism with the scanning of said film, and comparing successive time codes read for successive locations on the film.

41. An anticipatory method of reading sequential digital data out from a relatively slow access, large capacity digital storage device in response to a sequential control signal that is subject to jumps in the data sequence, comprising:

transferring digital data which sequentially follows the current control signal to a relatively fast access digital data storage buffer so that both the digital data which corresponds to the current control signal and sequentially following digital data is stored in said buffer, reading out digital data from said buffer under the control of said control signal, and in response to a jump in the control signal, making a corresponding jump in the digital data read out from said buffer.

42. The method of claim 41, wherein digital signals are transferred from said large capacity digital storage device to said buffer at a substantially higher rate than the digital signals are read out from said buffer following such a jump.

* * * * *